(12) United States Patent
Zhai

(10) Patent No.: US 11,215,916 B2
(45) Date of Patent: Jan. 4, 2022

(54) COMPACT SIZE MULTI-CHANNEL LIGHT ENGINE PROJECTION APPARATUS

(71) Applicant: DigiEngin Inc., Union City, CA (US)

(72) Inventor: Jinhui Zhai, Union City, CA (US)

(73) Assignee: DIGIENGIN INC., Union City, CA (US)

( * ) Notice: Subject to any disclaimer, the term of this patent is extended or adjusted under 35 U.S.C. 154(b) by 0 days.

(21) Appl. No.: 16/885,643

(22) Filed: May 28, 2020

(65) Prior Publication Data

US 2021/0373429 A1    Dec. 2, 2021

(51) Int. Cl.
| | |
|---|---|
| *G03B 21/20* | (2006.01) |
| *G03B 33/12* | (2006.01) |
| *G03B 21/16* | (2006.01) |
| *G03B 21/28* | (2006.01) |
| *G03B 21/00* | (2006.01) |
| *G02B 27/14* | (2006.01) |
| *G02B 27/10* | (2006.01) |

(52) U.S. Cl.
CPC ............ *G03B 33/12* (2013.01); *G02B 27/141* (2013.01); *G03B 21/008* (2013.01); *G03B 21/16* (2013.01); *G03B 21/204* (2013.01); *G03B 21/2013* (2013.01); *G03B 21/28* (2013.01); *G02B 27/1086* (2013.01)

(58) Field of Classification Search
CPC ...... G03B 21/008; G03B 21/16; G03B 21/28; G03B 21/58; G03B 21/204; G03B 21/208; G03B 21/2013; G03B 21/2033; G03B 33/00; G03B 33/08; G03B 33/10; G03B 33/12; H04N 9/3105; H04N 9/3155; H04N 9/3161; H04N 9/3164; H04N 9/3173; G02B 27/126; G02B 27/141; G02B 27/142; G02B 27/285
See application file for complete search history.

(56) References Cited

U.S. PATENT DOCUMENTS

| | | | | |
|---|---|---|---|---|
| 2007/0297170 | A1* | 12/2007 | Tatsuno | G02B 27/1053 362/227 |
| 2010/0290498 | A1* | 11/2010 | Hata | H04N 9/3161 372/50.12 |

* cited by examiner

*Primary Examiner* — Sultan Chowdhury
(74) *Attorney, Agent, or Firm* — Gavrilovich, Dodd & Lindsey LLP

(57) ABSTRACT

A compact size light engine apparatus is disclosed, comprising at least a wedged dichroic mirror or a dichroic X-plate/cube to combine multiple RGB LEDs, and a folded light path assembly with a folding mirror or a right-angle prism for a miniaturized light engine system. Furthermore, the compact size light engine apparatus may comprise at least a long red wavelength light source with peak wavelength over 630 nm. A 2-channel/3-channel/4-channel compact size light engine configuration is disclosed that comprise at least one red light source, one blue light source, and one green light source, combined by a wedged dichroic mirror or a dichroic X-plate/cube into co-axis light path without Etendue increase and illuminate digital mirror device (DMD) micro-display and afterwards project the image from the micro-display onto the screen through projection lens.

25 Claims, 8 Drawing Sheets

COMPACT SIZE MULTI-CHANNEL LIGHT ENGINE PROJECTION APPARATUS

TECHNICAL FIELD

The disclosed technology relates to light engine apparatus, and particularly to compact size multi-channel light engine apparatus for a projection light engine system, which may comprise an outstanding beam combiner like a wedged dichroic plates or X-plate dichroic mirror or dichroic X-cube.

BACKGROUND

Recently, micro-display projection gains lot of attraction for its portable and mobile projection display, especially with the technology progress of semiconductor light source like laser and light emitting diode (LED). Micro-display projection has been widely used in pico-projector, smart mobile projector, smart speaker projection, smart TV and other projection display applications. It's important to have a compact size light engine, plus a good thermal management solution for applications like small appliances embedded projection module and pocket size pico-projector, as well as high brightness.

The prior art of multi-channel light engine apparatus using multiple R/G/B LEDs can achieve high brightness, but the volume of light engine with multiple RGB LEDs is usually large, bulky size, which limit its applications in smart consumer electronics devices as an embedded projection module. In current market, high brightness pico-projector usually has big size and small compact projector usually has low lumen output. Accordingly, there is a need for a multi-channel light engine using multiple RGB LEDs to achieve high brightness as well as having miniaturized light engine volume.

In order to use multiple RGB LEDs in a compact size light engine, 2 LED dies or 3 LED dies may be packaged on the same substrate and enter same optical channel for light collimation. In a projection system, etendue matching is very important in order to efficiently use the light emitted from the light source, so there is optimal size for LED light in order to couple most of light, usually within 65~75 degrees FWHM beam angle of LED emitted light, into projection system with micro-display, such as TI DMD (digital micromirror devices) panel. It is very critical to combine multi-spectral light into a co-axial light path without etendue increase in a projection system. Accordingly, there is a need to combine the lights from 2 or 3 LED dies packaged on the same substrate into a co-axial light path without Etendue increase. Dichroic mirror combining is a good approach to combine multiple wavelengths, which may reflect certain wavelength range but pass through other wavelength range. It usually includes 30~50 dielectric layers coated in one dichroic mirror. It is easy to manufacture short-pass or long-pass dichroic mirror, which may reflect or transmit blue light, but pass or reflect longer wavelength green and red light, or reflect red light, but pass blue and green light. It's also relatively easy to manufacture a single band-pass dichroic mirror, but maybe difficult to manufacture a multiple band-passes filter. Accordingly, there is a need for a multi-channel light engine configuration to combine R/G/B light devices into a co-axial light path by using simple short-pass, long-pass or single band-pass dichroic mirrors for high brightness output in a compact size light engine apparatus.

SUMMARY

To overcome the bulky size challenge of high brightness light engine with multiple spectrum light devices, a compact size multi-channels light engine apparatus with an outstanding beam combiner and a specific light folded configuration is disclosed in this invention to miniaturize the enclosure volume of light engine system, which is the space that a light engine occupied inside a projector. The compact size multi-channels light engine apparatus comprises at least one red wavelength device, at least one green wavelength device, at least one blue wavelength device and at least an outstanding beam combiner, wherein at least two LED dies, which emit the different spectrums, are packaged on the same substrate and enter the same light collimation channel, and the different spectrums light beams will be combined by the outstanding beam combiner, which could be a wedged dichroic mirror or a diffraction grating plate; furthermore, the red wavelength light may comprise a long wavelength red device to emit a first red light beam with peak wavelength over 630 nm and a short wavelength red device to emit a second red light beam with peak wavelength less than 630 nm for red light brightness enhancement. Single channel/2-channel/3-channel/4-channel light engine configurations are disclosed to achieve high brightness light engine output with multiple spectrum LEDs, as well as in compact size with a specific light folded configuration. The dichroic filter coating of the wedged dichroic mirror, X-plate dichroic mirrors and standard dichroic mirrors in light engine apparatus will be configured to only use a long-pass filter, a short-pass filter, or a single band-pass filter for easy manufacturing. A long-pass filter will pass longer wavelength light, but reflect shorter wavelength light; a short-pass filter will pass shorter wavelength light, but reflect longer wavelength light; and a band-pass filter will reflect longer wavelength light and shorter wavelength light, but pass the wavelength light between the longer and shorter wavelength.

When at least two LED dies are packaged on the same substrate, the two different LEDs light beams will enter into the same optical collimation channel, but will be combined into a co-axial light path by an outstanding beam combiner. The outstanding beam combiner could be a wedged dichroic mirror or a diffraction grating component. The wedged dichroic mirror could be wedged plate mirror and each side of the plate has different dichroic filter coating. The wedged dichroic mirror could be replaced by two dichroic plates, each plate has different dichroic filter coating on one side and the two dichroic plates are deposited at a certain angle. For light combination by the wedged dichroic mirror, the two different wavelength LED dies are packaged on the same substrate and the light from both wavelength LED dies will enter into the same optical channel for light collimation, but the two wavelength light beams incident the wedged dichroic mirror at different angles and will be reflected by different sides of the wedged dichroic mirror, wherein the wedged dichroic mirror is configured to have a wedged angle and certain thickness, so that the principle axis of two wavelength light beams after reflected from two sides of the wedged dichroic mirror will be overlap into a co-axial light channel without Etendue increase. The diffraction grating component is a surface-relief dispersion grating to spatially separate the polychromatic light according to its spectral content, and the diffraction grating can be properly designed to use as a multi-spectral light beams combiner when used in the reversed light path, when two different spectral light beams incident the diffractive grating at certain angle, the reflected light beams can be reflected at different angles and will be combined into a co-axial light path.

In several aspects, multi-channel compact size light engine apparatuses are disclosed, which may comprise multiple RGB LED devices, an outstanding beam combiner which may include a wedged dichroic mirror, and a folded light path assembly configured so as to miniaturize the enclosure volume of the light engine projection apparatus, wherein the projection assembly may use TIR prism to save the volume in the light engine apparatus and enhance contrast level for the projection system, or may use RTIR (reversed TIR) prism to fold light path for miniaturizing light engine enclosure volume and enhance image quality. Furthermore, the multiple RGB LED device may include a long wavelength red with peak wavelength longer than 630 nm. By using long wavelength red LED with deep red peak wavelength longer than 630 nm, green/red light combination efficiency can get great improvement as well as having benefit of red light less sensitive to high driving current density and high duty cycle. Heat pipe or capillary heat pipe or vapor chambers solution may be used for thermal management in this compact size projection system.

In some aspects, the red LED die and blue LED die are package on the same substrate and the light from red and blue LED dies will enter into the same light collimation channel and will combine together with green light by a wedged dichroic mirror into a co-axial light path in two-channel compact size light engine apparatus. A folding mirror and a RTIR prism are used in this light engine apparatus to fold light path two times for a miniaturized light engine apparatus. RTIR prism component usually comprises a wedged prism and a right-angle prism, and the wedged prism can be bonded with a condenser lens into a cemented relay lens. In an alternative two-channel compact size light engine apparatus, the R/B packaged LED device and green LED device may sit in a same flat surface for simple thermal management with a single heat sink or heat pipe.

In other aspects, red LED die, green LED and blue LED dies are packaged on the same substrate and enter into a same collimation channel. When a converted green LED die is packaged together with red LED and blue LED dies on the same substrate, an emitting plane shifting plate may be deposited on top of the red and blue LED dies to raise up the light emitting plane of the red and blue LEDs and align with the light emitting plane of converted green LED which is on top of phosphor conversion platelet, so all the LED light beams when packaged on the same substrate, will be effectively emitted from the same plane. The effective light emitting plane means when backward extend of the light beams exiting from the emitting plane shifting plate, all the extended light beams will cross at the point from this plane, so all the exiting light beam look like emitted from this plane. With this emitting plane shifting plate on top of LED dies, the effective light emitting plane will higher than the LED emitting plane, so it is effectively raised up. The emitting plane shifting plate maybe a clear glass plate, a glass plate with micro features on top, or a faceplate fused with fiber bundles. The multi-spectrum light will be combined by cementing two wedged dichroic mirrors into a co-axial light path without Etendue increase in a single channel compact size light engine apparatus, wherein the cemented two wedged mirrors may have air gap between a bonded surface. The RGB light from the single channel will enter into the cemented two wedged dichroic mirrors at different angles and reflected at three surfaces of the cemented two wedged dichroic mirrors, wherein the RGB light will combine into a co-axial light path without Etendue increase after leaving the two wedged dichroic mirrors. RTIR prism component is used to fold the light path for a miniaturized light engine apparatus, where the wedged prism in RTIR prism component may be bonded with a condenser lens for easy light engine assembly, which is an aspherical convex flat lens, as a cemented relay lens to illuminate the micro-display panel. The cemented two wedged dichroic mirrors can be replaced by three dichroic plates deposited in certain wedge angle in an alternative apparatus, or one dichroic plate plus one wedged dichroic mirrors in another alternative apparatus of a single channel light engine. The RTIR prism component can be replaced by TIR prism component, wherein the convex flat lens may can be bonded onto the input surface of TIR prism. In these light engine apparatuses with 3 R/G/B LED devices, the red LED device may emit the long red wavelength with peak wavelength longer than 630 nm to have benefits of high green/red combination efficiency and red light less sensitive to high driving current and high duty cycle.

In other aspects, there are four R/G/B LED dies may be packaged onto two substrates and the R/G/B light beams will be combined into a co-axial light path by two wedged dichroic mirrors or a X-plate dichroic mirror in a two-channel compact size light engine apparatus. A folding mirror and a RTIR prism are used in this light engine apparatus to fold light path two times for a miniaturized light engine apparatus. The four R/G/B LED dies may also have two LED dies packaged on the same substrate and the other two LED dies are packaged on two separate substrates and the four LED light beams will be combined into a co-axial light path without Etendue increase by a wedged dichroic mirror or a X-plate dichroic mirror in a three-channel compact size light engine apparatus. In this three-channel light engine, the TIR prism component may be used to fold light path for a miniaturized light engine apparatus. Within four R/G/B LEDs, it may include a long wavelength red LED with peak wavelength longer than 630 nm. When a converted green LED die is packaged together with red LED or blue LED die on the same substrate, an emitting plane shifting plate may be deposited on top of the red or blue LED die to raise up the effective light emitting plane of the red or blue LEDs and align with the light emitting plane of converted green LED which is on top of phosphor conversion platelet. The emitting plane shifting plate maybe a clear glass plate, a glass plate with micro features on top, or a faceplate fused with fiber bundles.

In other aspects, there are five R/G/B LED dies having different spectrums, four of LED dies are packaged on two substrates and combined with a fifth LED light by one or two wedged dichroic mirrors, or plus a X-plate dichroic mirror into a co-axial light path in a three-channels compact size light engine apparatus, a TIR prism or RTIR prism component may be used in this three-channels light engine with 5 different spectrum LEDs. Five LEDs may have two LED dies packaged on the same substrate and other three LED dies are packaged on three separated substrates and they are combined into a co-axial light path without Etendue increase by a wedged dichroic mirror and a regular dichroic mirror in a four-channels compact size light engine apparatus. A TIR prism or RTIR prism configuration may be used in this four-channels light engine with 5 different spectrum LEDs. Five LEDs may also be packaged on five separate substrates and are combined into a co-axial light path by an X-plate dichroic mirror and a regular dichroic mirror in a five-channels compact size light engine apparatus. Within five spectrum LEDs, it may include a long wavelength red LED with peak wavelength longer than 630 nm.

Therefore, a compact size light engine apparatus is disclosed in this invention by packaging at least two different spectrum LED dies on the same substrate and combined by an outstanding beam combiner and by using specific light path folding assembly to overcome the bulk size challenge of light engine apparatus when using multiple spectrum LEDs in a high brightness projection system. Furthermore, a long red wavelength with deep red peak wavelength over 630 nm is used or be combined with short red wavelength with red-amber peak wavelength less than 630 nm to overcome red LED droop issue at high current density and high duty cycle, and red LED light brightness bottleneck in green brightness enhanced light engine apparatus. With this invention, high brightness light engine performance in compact size can be achieved with system output brightness as high as 5000 lm.

The scope of the invention is defined by the claims. A more complete understanding of embodiments of the present disclosure will be afforded to those skilled in the art, as well as a realization of additional advantages thereof, by a consideration of the following detailed description of one or more embodiments.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

As used herein and in the appended claims, the singular forms "a," "an," and "the" include plural referents unless the context clearly dictates otherwise. Thus, for example, reference to "a lens" includes a plurality of such lens and reference to "the light source" includes reference to one or more light sources, and so forth.

Unless defined otherwise, all technical and scientific terms used herein have the same meaning as commonly understood to one of ordinary skill in the art to which this disclosure belongs. Although methods and materials similar or equivalent to those described herein can be used in the practice of the disclosed methods and compositions, the exemplary methods, devices and materials are described herein.

Also, the use of "or" means "and/or" unless stated otherwise. Similarly, "comprise," "comprises," "comprising" "include," "includes," and "including" are interchangeable and not intended to be limiting.

It is to be further understood that where descriptions of various embodiments use the term "comprising," those skilled in the art would understand that in some specific instances, an embodiment can be alternatively described using language "consisting essentially of" or "consisting of."

Any publications discussed above and throughout the text are provided solely for their disclosure prior to the filing date of the present application. Nothing herein is to be construed as an admission that the inventors are not entitled to antedate such disclosure by virtue of prior disclosure.

Figure 1:
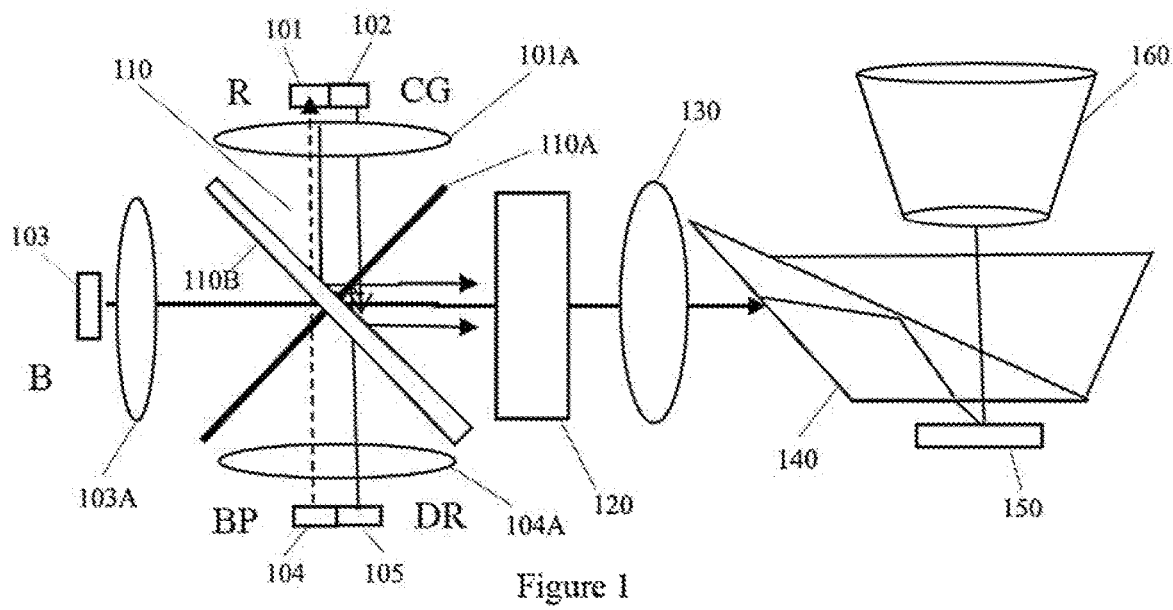
FIG. 1 illustrates an embodiment of a compact size 3-channel light engine apparatus according to the present disclosure.

As the first embodiment of a compact size high brightness 3-channel light engine apparatus according to the disclosure comprises 5 LED devices and four LED dies are packaged on two substrates, where the four LED light beams will be combined with the fifth LED light beam by outstanding beam combiners like wedged dichroic mirror and X-plate dichroic mirror, into a co-axial light path without Etendue increase in a compact size 3-channel light engine apparatus. As shown in FIG. 1 the compact size three-channel light engine apparatus comprises a converted green(CG) LED 102, in which a green phosphor platelet directly deposits on top of a blue LED die, a short wavelength blue pump (BP) LED 104 to emit peak wavelength of 430~450 nm to remotely pump the green phosphor platelet from the top side, a display blue (B) LED 103 to emit peak wavelength of 440~460 nm, a long wavelength red LED 105 with deep red (DR) peak wavelength of 640~660 nm, and a short wavelength red LED 101 to emit red-amber (R) peak wavelength around 620 nm. The converted green (CG) LED die of the converted green (CG) LED 102 and red-amber (R) die of the short wavelength red LED 101 can be packaged on the same substrate, wherein an emitting plane shifting plate (not drawn) may be deposited on the top of red-amber die to raise the effective light emitting plane of red light to align with the emitting plane of converted green light, and the emitting plane shifting plate maybe a clear glass plate, a glass plate with micro features on top, or a faceplate fused with fiber bundles; and the converted green light beam and the red-amber light beam are converged by a lens 101A and then enter into the first collimation optical channel; the short wavelength blue pump (BP) LED die of the short wavelength blue pump (BP) LED 104 and the long wavelength deep red (DR) LED die of the long wavelength red LED 105 are packaged on the same substrate, the blue pump light beam and the deep red light beam are converged by a lens 104A and then enter into the second collimation optical channel, and the blue pump (BP) light will remotely pump the phosphor platelet of the CG LED 102 from the top side thereof. The converted green light beam, the red amber light beam and the deep red light beam will be combined with a display blue light beam, which is emitted from the display blue (B) LED 103 and converged by a lens 103A as the third collimation optical channel, by a X-plate dichroic mirror 110, which includes a regular dichroic plate 110A and a wedged dichroic plate 110B, wherein the wedged dichroic plate 110B is used to combine the light from the converted green LED 102 and the light from the red-amber LED 101 into a co-axial light path without Etendue increase. The peak wavelength of the deep red light needs to be different from that of the amber-red light at no less than 25 nm to reduce dichroic mirror cutting loss. The dielectric dichroic coating of the regular dichroic plate 110A in the X-plate dichroic mirror 110 is a short-pass filter which reflects the deep red light, but passes through blue, green and red-amber light. The dielectric dichroic coating of the wedged dichroic plate 110A in X-plate dichroic mirror 110 is a single band-pass filter, wherein the top side dielectric coating of the wedge dichroic mirror 110B will reflect the green light, but pass through blue, red-amber and deep red light, and the bottom side dielectric coating of the wedge dichroic mirror 110B will reflect green and red light, but pass through blue and deep red light. For the converted green die and the red-amber die which are packaged on the same substrate and the converted green light beam and the red-amber light beam will be combined by the wedged dichroic mirror 110B, the two different wavelength light beams incident the wedged dichroic mirror 110B at different angles and will be reflected by different sides of the wedged dichroic mirror 110B, which is configured to have a wedged angle, so that the principle axis of two different wavelength light beams after reflected from the different sides of the wedged dichroic mirror 110B will overlap into the co-axial light path without etendue increase. In alternative embodiment, the plate 110B maybe diffraction grating plate, which reflects two different wavelength light beam and combine into co-axial light path when said two different wavelength light beams incident the diffraction grating plate 110B at different angles. The co-axial light path R/G/B combined light will hit a fly-eye lens array 120 for homogenization before entering a TIR prism 140 by a condenser lens 130. The TIR prism 140 is used here to fold the illumination light from the condenser lens 130, and the folded light beam will enter into the projection lens 160 after being reflected from a DMD micro-display panel 150. Wherein, there is a certain angle between the optical axis of the condenser lens and the principle axis of the co-axial light path to ensure an uniform beam distribution at DMD micro-display panel when the light incident the micro-display panel at a predefined angle. A thermal pipe or vapor channel solution (no shown) may be used for thermal management in this 3-channel light engine apparatus to miniature the enclosure volume of the light engine. All the LED devices can be driven at high current density over 4~6 A/mm^2 for high brightness light engine output as high as 3000 lm. The CG LED 102 is a converted green LED device with a green phosphor platelet directly depositing on top of a blue LED die, and can be replaced by a remotely phosphor conversion green light device with a green phosphor deposited on a high reflective and thermally conductive substrate and the blue light pump the green phosphor from the top side.

Figure 2:
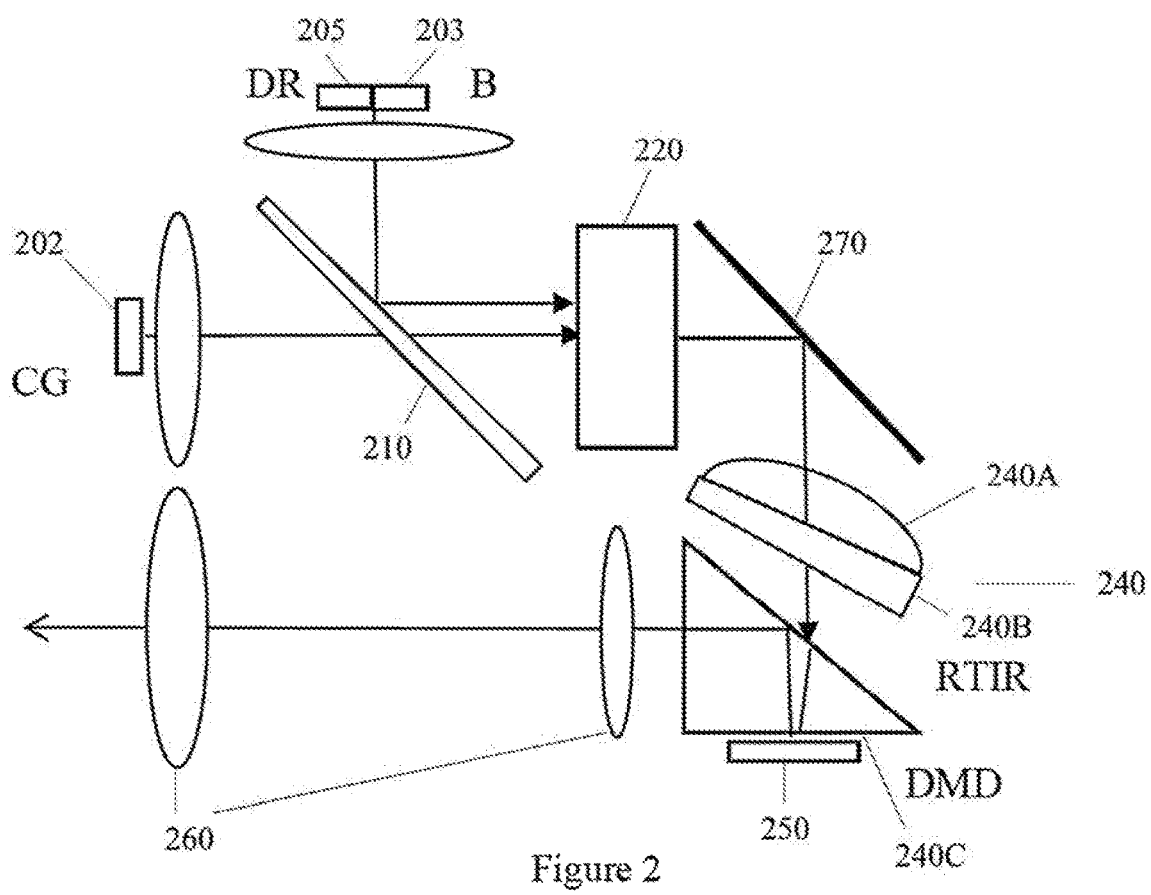
FIG. 2 illustrates an embodiment of a compact size 2-channel light engine apparatus according to the present disclosure.

As shown in FIG. 2 an embodiment of a compact size 2-channel light engine apparatus according to the disclosure comprises a green LED 202, a blue LED 203 and a red LED 205, wherein a blue LED die of the blue LED 203 and a red LED die of the red LED 205 are packaged on the same substrate so that the blue light beam emitted from the blue LED 203 and the red light beam emitted from the red LED 205 will enter into the same collimation optical channel, the blue/red light beams will be combined with the green light beam emitted from the green LED 202 into a co-axial light path by a wedged dichroic mirror 210. Furthermore, the red LED 205 may emit a long wavelength deep red light with peak wavelength over 630 nm and the apparatus further comprises a folding mirror 270 to fold the light path to miniaturize the enclosure volume of the light engine. As shown in FIG. 2, the blue light beam and the red light beam from the blue LED die and long wavelength deep red LED die respectively will be reflected at two different sides of the wedged dichroic mirror 210 and enter into a co-axial light path without Etendue increase, wherein the deep red LED 205 may emit the long wavelength light with peak wavelength of 640~660 nm. The mixed red/green/blue light will pass through a fly-eye lens array 220 and then be folded by a folding mirror 270 and enter into a RTIR prism assembly 240. A conventional RTIR prism comprises a right angle prism and a wedged prism, but in this configuration, the RTIR prism assembly 240 comprises a condenser lens 240A which is an aspherical convex flat lens, a wedged prism 240B and a right angle prism 240C, in which the condenser lens 240A is cemented with the wedge prism 240B into a cemented relay optics. The cemented relay optics is used to focus the mixed RGB light after being homogenized by fly-eye lens array onto the micro-display panel and the optical axis of the cemented relay optics has an inclined angle with co-axial light path axis to ensure that the principle axis of mixed RGB light beam incident at micro-display panel plane at a predefined angle. The mixed red/green/blue light passes through the condenser lens 240A, the wedged prism 240B and the right-angle prism 240C sequentially, and projects the fly-eye lens array (not shown) onto a DMD panel 250 for uniformly illuminate of the DMD panel, and then is reflected by the DMD panel 250. The reflected light from the DMD panel 250 will be folded by the right-angle prism 240C of the RTIR prism assembly 240 and project the image from the DMD panel 250 onto the screen by the projection lens 260 in this miniaturized light engine apparatus. This compact size 2-channel light engine apparatus with the folding mirror and a cemented relay optics can greatly reduce the number of optical components for easy assembly as well as low cost solution for small light engine projection using TI 0.2" and 0.23" DMD panels to reach system brightness as high as 2000 lm in pico-projection and embedded projection in smart appliances like smart speaker, smart kitchenware, desktop projector, robot and etc.

As shown in FIG. 2, the blue light beam and the red light beam from the blue LED die and long wavelength deep red LED die respectively will be reflected at two different sides of the wedged dichroic mirror 210 and enter into a co-axial light path without Etendue increase, wherein the deep red LED 205 may emit the long wavelength light with peak wavelength of 640~660 nm. The mixed red/green/blue light will pass through a fly-eye lens array 220 and then be folded by a folding mirror 270 and enter into a RTIR prism assembly 240. A conventional RTIR prism comprises a right angle prism and a wedged prism, but in this configuration, the RTIR prism assembly 240 comprises a condenser lens 240A which is an aspherical convex flat lens, a wedged prism 240B and a right angle prism 240C, in which the condenser lens 240A is cemented with the wedge prism 240B into a cemented relay optics. The cemented relay optics is used to focus the mixed RGB light after being homogenized by fly-eye lens array onto the micro-display panel and the optical axis of the cemented relay optics has an inclined angle with co-axial light path axis to ensure that the principle axis of mixed RGB light beam incident at micro-display panel plane at a predefined angle. The mixed red/green/blue light passes through the condenser lens 240A, the wedged prism 240B and the right-angle prism 240C sequentially, and projects the fly-eye lens array (not shown) onto a DMD panel 250 for uniformly illuminate of the DMD panel, and then is reflected by the DMD panel 250. The reflected light from the DMD panel 250 will be folded by the right-angle prism 240C of the RTIR prism assembly 240 and project the image from the DMD panel 250 onto the screen by the projection lens 260 in this miniaturized light engine apparatus. This compact size 2-channel light engine apparatus with the folding mirror and a cemented relay optics can greatly reduce the number of optical components for easy assembly as well as low cost solution for small light engine projection using TI 0.2" and 0.23" DMD panels to reach system brightness as high as 2000 lm in pico-projection and embedded projection in smart appliances like smart speaker, smart kitchenware, desktop projector, robot and etc.

Figure 3:
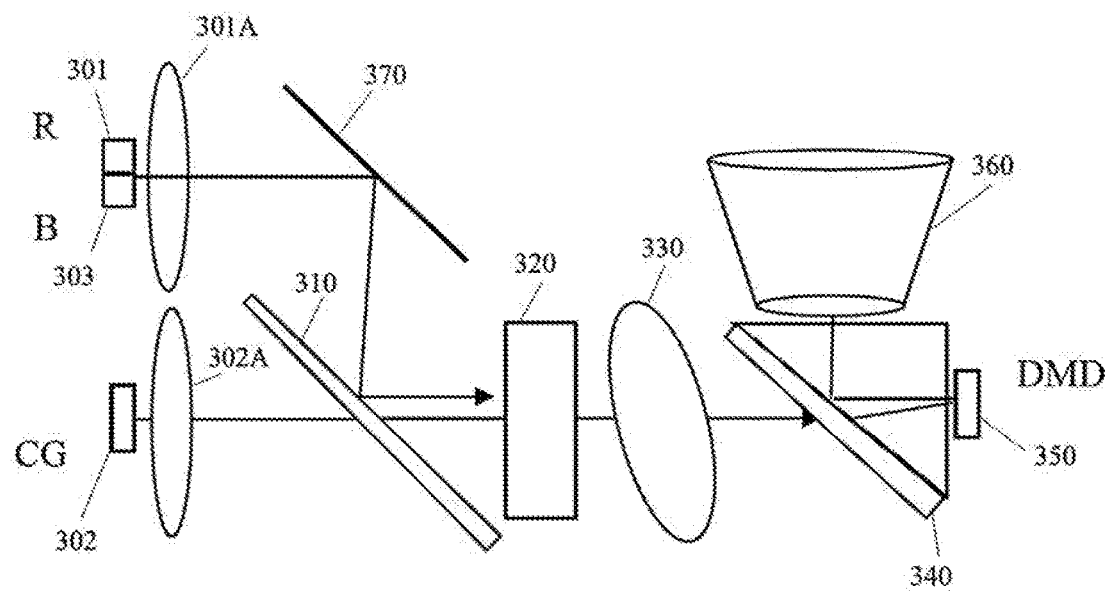
FIG. 3 illustrates an alternative embodiment of a compact size 2-channel light engine apparatus according to the present disclosure.
Figure 4:
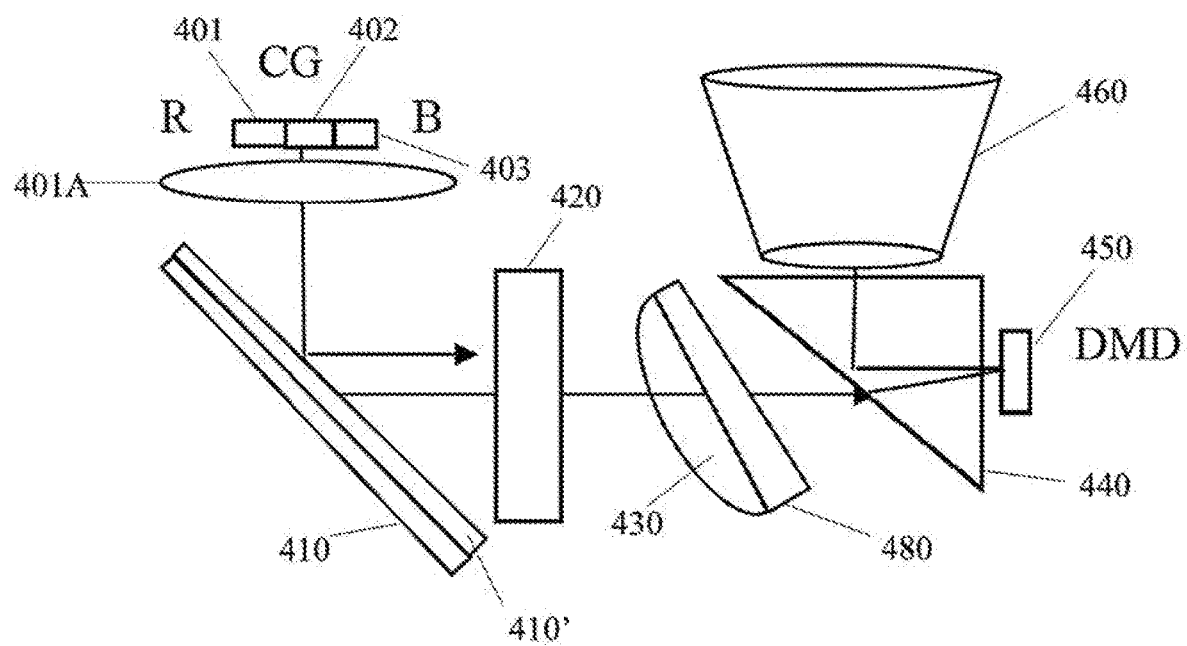
FIG. 4 illustrates an embodiment of a compact size single channel light engine apparatus according to the present disclosure.
Figure 5:
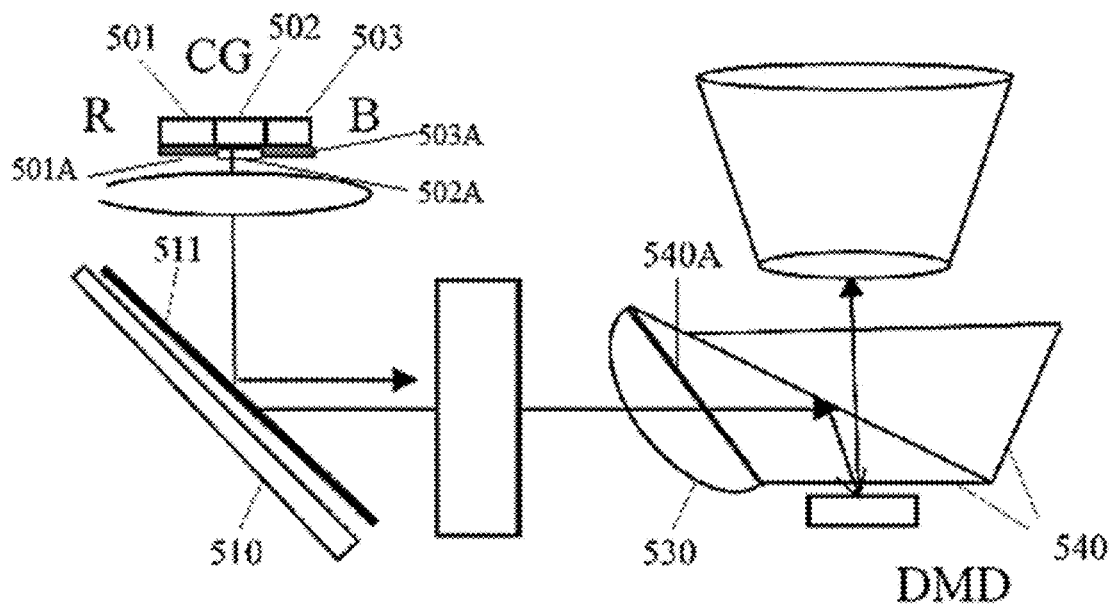
FIG. 5 illustrates an alternative embodiment of a compact size single channel light engine apparatus according to the present disclosure.

As shown in FIG. 3 an alternative embodiment of a compact size 2-channel light engine apparatus according to the disclosure comprises a red LED 301, a blue LED 303 and a green LED 302, wherein a blue LED die of the blue LED 303 and a red LED die of the red LED 305 are packaged on the same substrate so that the blue light beam emitted from the blue LED 203 and the red light beam emitted from the red LED 205 will enter into the same collimation optical channel (i.e. the first collimation optical channel). The R/B light beams will be reflected by a folding mirror 370 after being converged by a lens 301A, and then will be reflected at two different sides of the wedged dichroic mirror 310. The green light beam emitted from the green LED 302 and converged by a lens 302A as the second collimation optical channel will pass through the wedged dichroic mirror 310 and combine with the reflected R/B light beams into a co-axial light without Etendue increase. The mixed red/green/blue light will pass through a fly-eye lens array 320 and an inclined condenser lens 330, enter into a RTIR prism 340 and then project onto a DMD panel 350 for uniform illumination of the DMD panel. The inclined angle of the inclined condenser lens 330 is defined so that the principle axis of mixed RGB light beam incident at the micro-display panel plane at a predefined angle. After being reflected by the DMD panel 350, the reflected light beam will be folded by a right-angle prism of the RTIR prism 340 and project the image from the DMD panel 350 onto the screen by the projection lens 360 in this miniaturized light engine apparatus. In this apparatus, the red LED 305 may emit a long wavelength deep red light with peak wavelength over 630 nm, preferably in the range of 640~660 nm. As a folding mirror and a RTIR prism are used in this light engine apparatus to fold light path two times. This compact size 2-channel light engine apparatus can greatly reduce the volume of the apparatus as well as low cost solution for small light engine projection using TI 0.2" and 0.23" DMD panels to reach system brightness as high as 200 lm in pico-projection and embedded projection in smart appliances like smart speaker, smart kitchenware, desktop projector, robot and etc. Furthermore, the R/B packaged LED device and green LED device sit in a same flat surface for simple thermal management with a single heat sink or heat pipe. As shown in FIG. 4 an embodiment of a compact size single channel light engine apparatus according to the disclosure comprises a red LED 401, a green LED 402 and a blue LED 403, wherein a red die of the red LED 401, a green die of the green LED 402 and a blue die of the blue LED 403 are packaged on the same substrate and enter into the same collimation channel after being converged by a lens 401A. The multi-spectrum R/G/B light beams will be combined by cementing two wedged dichroic mirrors 410, 410' into a co-axial light path without Etendue increase in the single channel compact size light engine apparatus, wherein the cemented two wedged mirrors 410, 410' may have an air gap on a bonded surface between the cemented two wedged mirrors. The R/G/B light beams from the single channel will enter into the cemented two wedged dichroic mirrors at different angles and be reflected at three surfaces of the cemented two wedged dichroic mirrors 410, 410' respectively, wherein the R/G/B light beams will be combined into a co-axial light path without Etendue increase after leaving the two wedged dichroic mirrors and a fly-eye lens array 420. The single channel light engine apparatus further comprises a RTIR prism component, which comprises a wedged prism 480 and a right-angle prism 440 and is used to fold the light path for a miniaturized light engine apparatus. The wedged prism 480 in RTIR prism component may be bonded with an inclined condenser lens 430 for easy light engine assembly, which is an aspherical convex flat lens and the optical axis of the condenser lens is inclined with the principle axis of the light path at a certain angle, as a cemented relay lens to illuminate the micro-display panel 450. The light beam reflected by the micro-display panel 450 will be folded by the right-angle prism 440 and project the image from the micro-display panel 450 onto the screen by the projection lens 460. The cemented two wedged dichroic mirrors can be replaced by three dichroic plates deposited in a certain wedge angle in an alternative apparatus. As an alternative of a single channel compact size light engine apparatus shown in FIG. 5, it also comprises a red LED 501, a green LED 502 and a blue LED 503. However, the cemented two wedged dichroic mirrors are replaced by one dichroic plate 511 plus one wedged dichroic mirror 510, wherein the dichroic plate and the wedged dichroic mirror is disposed at an angle so as to reflect the red/green/blue right into a co-axial light beam, and the RTIR prism component is replaced by a TIR prism component 540, wherein the convex flat lens 530 is bonded onto the input surface 540A of the TIR prism component 540 for easy light engine assembly. In these light engine apparatuses with 3 R/G/B LED devices, the red LED may emit the long red wavelength with peak wavelength longer than 630 nm to have benefits of high green/red combination efficiency and red light less sensitive to high driving current and high duty cycle. Furthermore, the R/G/B dies are packaged on the same substrate so that the R/G/B devices may sit in a same flat surface for simple thermal management with a single heat sink or heat pipe. Furthermore, when the green LED is a converted green LED with phosphor platelet 502A on top of blue die, an emitting plane shifting plate 501A and 503A may be deposited on top of red and blue LED dies to raise the effective light emitting plane to align with the emitting plane of the converted green LED. The emitting plane shifting plate maybe a clear glass plate, a glass plate with micro features on top, or a faceplate fused with fiber bundles.

Figure 6:
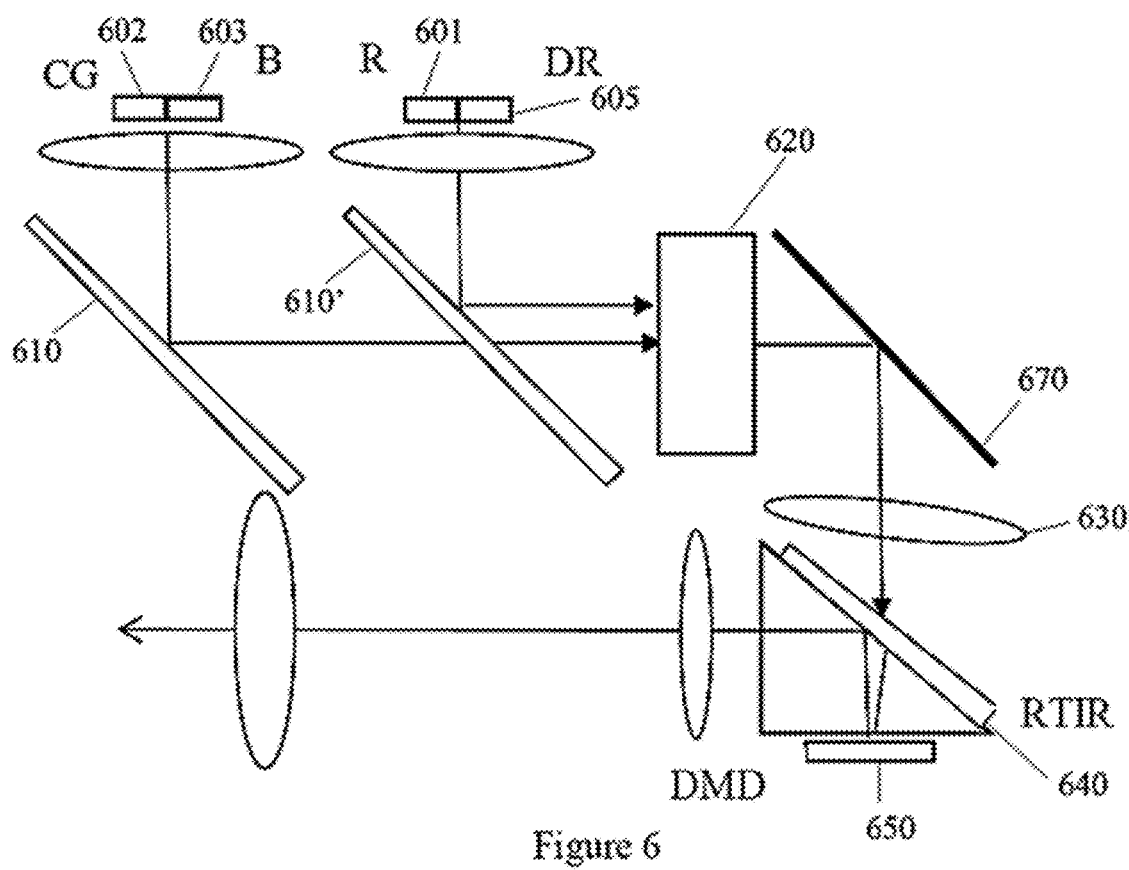
FIG. 6 illustrates another alternative embodiment of a compact size 2-channel light engine apparatus according to the present disclosure.

As another alternative embodiment of a compact size 2-channel light engine apparatus according to the disclosure as shown in FIG. 6, comprises 4 LED devices including a red LED 601, a deep red LED 605, a green LED 602 and a blue LED 603. A green die of the green LED 602 and the blue die of the blue LED 603 are packaged onto one substrate and the green light beam and the blue light beam will be combined into a co-axial light path by a wedged dichroic mirror 610, while a red die of the red LED 601 and the deep red die of the deep red LED 605 are packaged onto the other substrate and the red-amber light beam and the deep red light beam will be combined into a co-axial light path by a wedged dichroic mirror 610'. After hitting the fly-eye lens array 602, the R/G/B light beams will be reflected by a folding mirror 670. The reflected light beam will pass through an inclined condenser lens 630 and enter into a RTIR prism 640 to illuminate a DMD 650. In this configuration, the folding mirror 670 and a RTIR prism 640 are used in this light engine apparatus to fold light path two times for a miniaturized light engine apparatus, and the deep red LED may emit the long red wavelength with peak wavelength longer than 630 nm to have benefits of high green/red combination efficiency and red light less sensitive to high driving current and high duty cycle. Furthermore, the R/G/B dies are packaged on two substrates which may sit in a same flat surface for simple thermal management with a single heat sink or heat pipe. As alternative, the two wedged dichroic mirrors 610, 610' may be replaced by a X-plate dichroic mirror.

Figure 7:
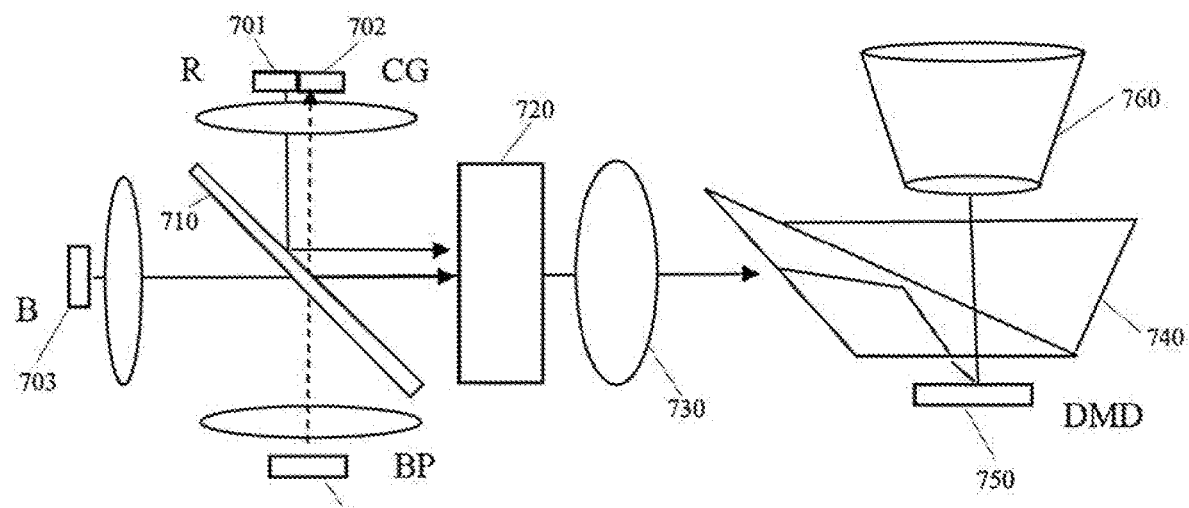
FIG. 7 illustrates an alternative embodiment of a compact size 3-channel light engine apparatus according to the present disclosure.
Figure 8:
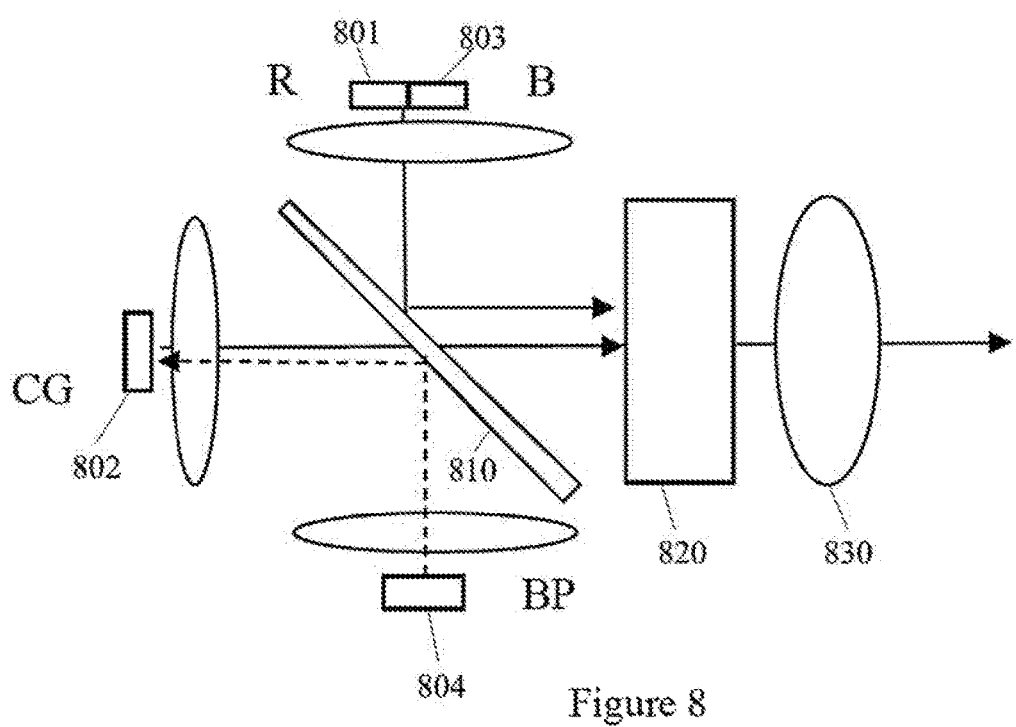
FIG. 8 illustrates another alternative embodiment of a compact size 3-channel light engine apparatus according to the present disclosure.
Figure 9:
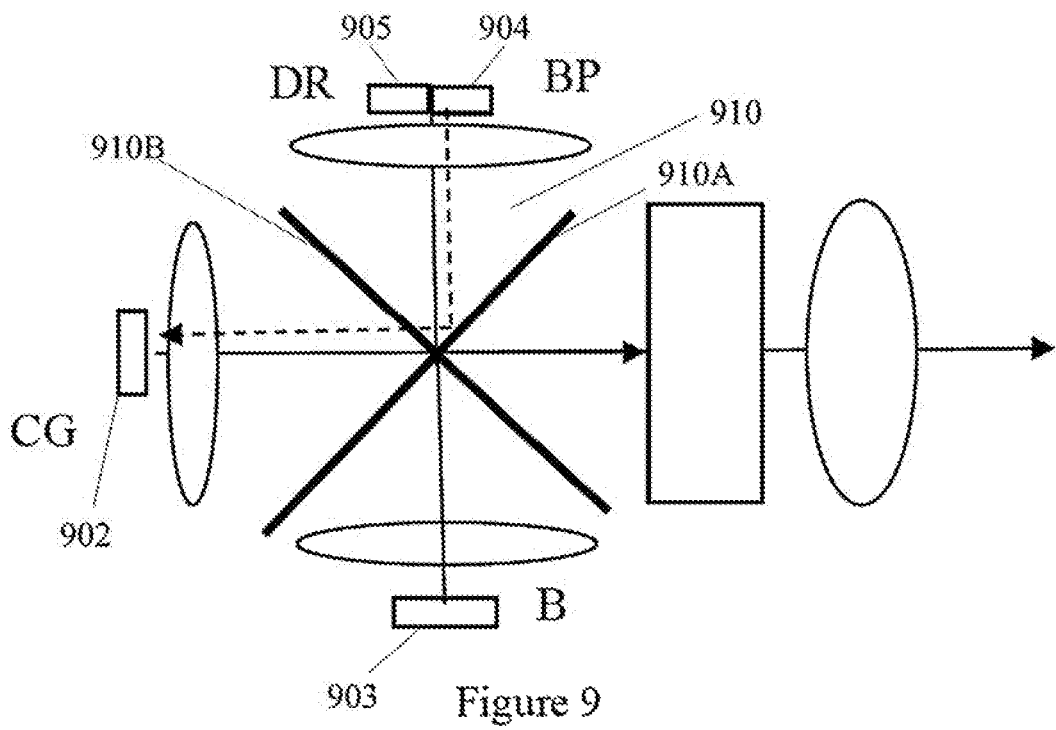
FIG. 9 illustrates another alternative embodiment of a compact size 3-channel light engine apparatus according to the present disclosure.
Figure 10:
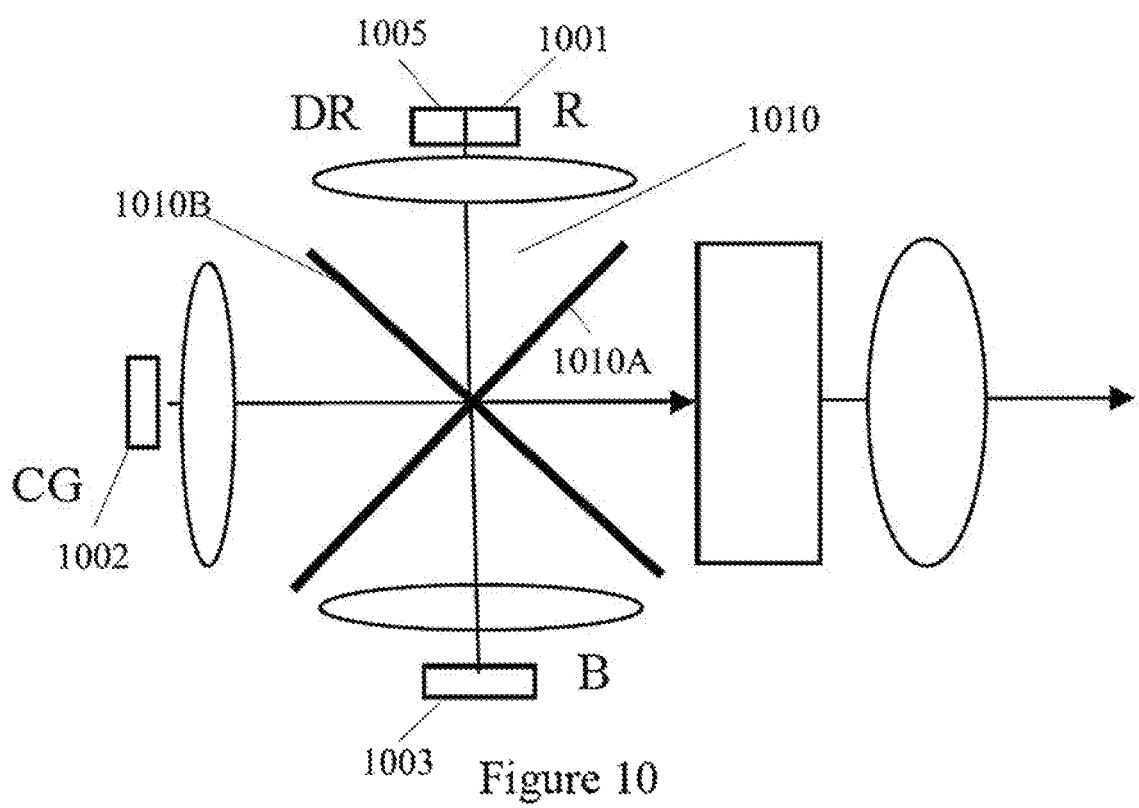
FIG. 10 illustrates another alternative embodiment of a compact size 3-channel light engine apparatus according to the present disclosure.

As an alternative embodiment of a compact size 3-channel light engine apparatus according to the disclosure is shown in FIG. 7 and comprises 4 LED devices including a red LED 701, a converted green (CG) LED 702, a blue LED 703 and a blue pump LED 704, in which a red die of the red LED 701 and a converted green die of the converted green LED 702 are packaged onto the same substrate. The blue pump light from the blue pump LED 704 is used to remotely pump the green phosphor platelet on the CG LED 702 from the top of the platelet and the top pumped green light will be reflected at reflective layer of LED die of the CG LED 702 and combined together with the bottom pumping converted green LED light, and then the converted green light will be combined with the display blue light from the blue LED 703 by a wedged dichroic mirror 710, which can be replaced by a X-plate dichroic mirror, into a co-axial light path without Etendue increase. The use of the blue pump LED highly increases the brightness of the green light. The combined light beam will pass through the fly-eye lens array 720 and a condenser lens 730, and then enter into the input surface of a TIR prism 740, which is used to fold light path for a miniaturized light engine apparatus. The light beam reflected by the micro-display panel 750 will pass through the TIR prism 740 and project the image from the micro-display panel 750 onto the screen by the projection lens 760. In this apparatus, the red LED may be a long wavelength red LED with peak wavelength longer than 630 nm. Another alternative embodiment of a compact size 3-channel light engine apparatus according to the disclosure is shown in FIG. 8, and the difference between the embodiment of FIG. 7 and that of FIG. 8 lies in the arrangement of the LED devices. As shown in FIG. 8, a red LED die of the red LED 801 and a blue LED die of the blue LED 803 are packaged onto the same substrate. The blue pump light from a blue pump LED 804 is reflected by a wedged dichroic mirror 810 so as to remotely pump the green phosphor platelet on a converted green (CG) LED 802 from the top of the platelet, and the top pumped green light will be reflected at reflective layer of LED die of the CG LED 802 and combined together with the bottom pumping converted green LED light, and then the converted green light will be combined with the display blue light from the blue LED 803 by a wedged dichroic mirror 810 into a co-axial light path without Etendue increase. The combined light beam will pass through the fly-eye lens array 820 and a condenser lens 830. As an alternative, the wedged dichroic mirror can be replaced by an X-plate dichroic mirror, as shown in FIGS. 9-10. Specifically, the 3-channel light engine apparatus in FIG. 9 also comprises 4 LED devices, i.e. a red LED 905, a converted green (CG) LED 902, a blue LED 903 and a blue pump LED 904, in which a red die of the red LED 905 and a blue pump die of the blue pump LED 904 are packaged onto the same substrate. The blue pump light from the blue pump LED 904 is reflected by one plate 910A of a X-plate dichroic mirror 910 so as to remotely pump the green phosphor platelet on a converted green (CG) LED 902 from the top of the platelet, and the top pumped green light will be reflected at reflective layer of LED die of the CG LED 902 and combined together with the bottom pumping converted green LED light, and then the converted green light will pass through the X-plate dichroic mirror 910. The display blue light from the blue LED 903 will be reflected by the plate 910A, and the red light from the red LED 905 will be reflected by the other plate 910B of the X-plate dichroic mirror 910. The reflected red light and the reflected display blue light will be combined with the converted green light into a co-axial light path without Etendue increase. Except for the arrangement of the LED devices, the configuration of the 3-channel light engine apparatus shown in FIG. 10 is similar to that of the 3-channel light engine apparatus shown in FIG. 9. The CG LED 702,802,902 is a converted green LED with a green phosphor platelet directly depositing on top of a blue LED die, and can be replaced by a remotely phosphor conversion green light device with a green phosphor deposited on a high reflective and thermally conductive substrate and the blue light pump the green phosphor from the top side, or a converted green rod/pipe with multiple blue LED dies attached to the rod/pipe which have green phosphor coated on a surface of the rod/pipe. As shown in FIG. 10, a red LED die of the red LED 1001 and a deep red LED die of the deep red LED 1005 are packaged onto the same substrate. The blue light from a blue LED 1003 is reflected by one plate 1010A of an X-plate dichroic mirror 1010, and the red-amber light from the red LED 1001 and the deep red light from the red deep LED 1005 are reflected by the other plate 1010B of the X-plate dichroic mirror 1010. The reflected red light, deep red light and the blue light will be combined with the green light from a green LED 1002 into a co-axial light path without Etendue increase. The deep red LED 1005 may emit a long wavelength deep red light with peak wavelength over 630 nm, preferably in the range of 640~660 nm. The peak wavelength of the deep red light needs to be different from that of the amber-red light at no less than 25 nm to reduce dichroic mirror cutting loss.

Figure 11:
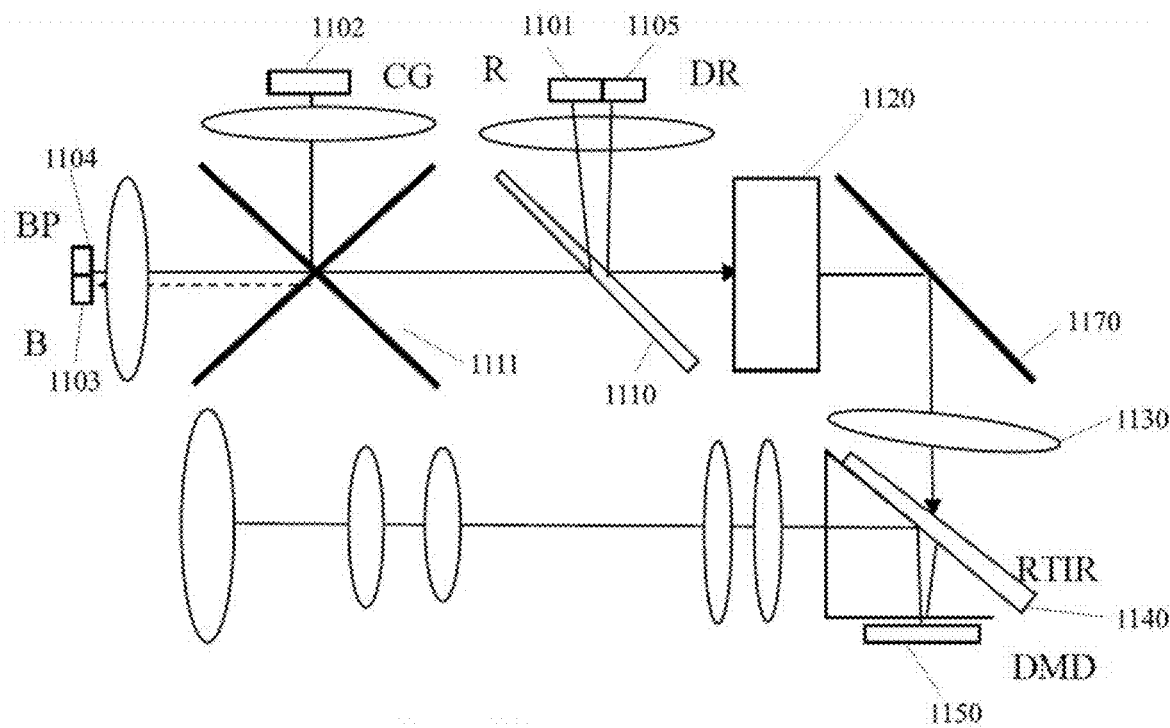
FIG. 11 illustrates another alternative embodiment of a compact size 3-channel light engine apparatus according to the present disclosure.

As another alternative embodiment of a compact size 3-channel light engine apparatus according to the disclosure is shown in FIG. 11 and comprises five R/G/B LED devices having different spectrums, including a red LED 1101, a converted green (CG) LED 1102, a blue LED 1103, a blue pump LED 1104 and a deep red LED 1105. A red die of the red LED 1101 and a deep red die of the deep red LED 1105 are packaged onto one substrate, and the red-amber light beam from the red LED 1101 and the deep red light beam will be combined into a co-axial light path by a wedged dichroic mirror 1110; and a blue die of the blue LED 1103 and a blue pump die of the blue pump LED are packaged onto the other substrate, and the display blue light beam from the blue LED 1103 will pass through a X-plate dichroic mirror 1111 but the blue pump light beam from the blue pump LED 1104 will be reflected by the X-plate dichroic mirror 1111 so as to remotely pump the green phosphor platelet on the CG LED 1102 from the top of the platelet and the top pumped green light will be reflected at reflective layer of LED die of the CG LED 1102 and combined together with the bottom pumping converted green LED light, and then the converted green light will be combined with the display blue light from the blue LED 1103 by the X-plate dichroic mirror 1111. After further combining with the red-amber light beam and the deep red-light beam by the wedged dichroic mirror 1110, the R/G/B light beams will pass through a fly-eye lens array 1120 and be reflected by a folding mirror 1170. The reflected light beam will pass through an inclined condenser lens 1130 and enter into a RTIR prism 1140 to illuminate a DMD 1150. In this configuration, the folding mirror 1170 and a RTIR prism 1140 are used in this light engine apparatus to fold light path two times for a miniaturized light engine apparatus, and the deep red LED may emit the long red wavelength with peak wavelength longer than 630 nm to have benefits of high green/red combination efficiency and red light less sensitive to high driving current and high duty cycle.

Figure 12:
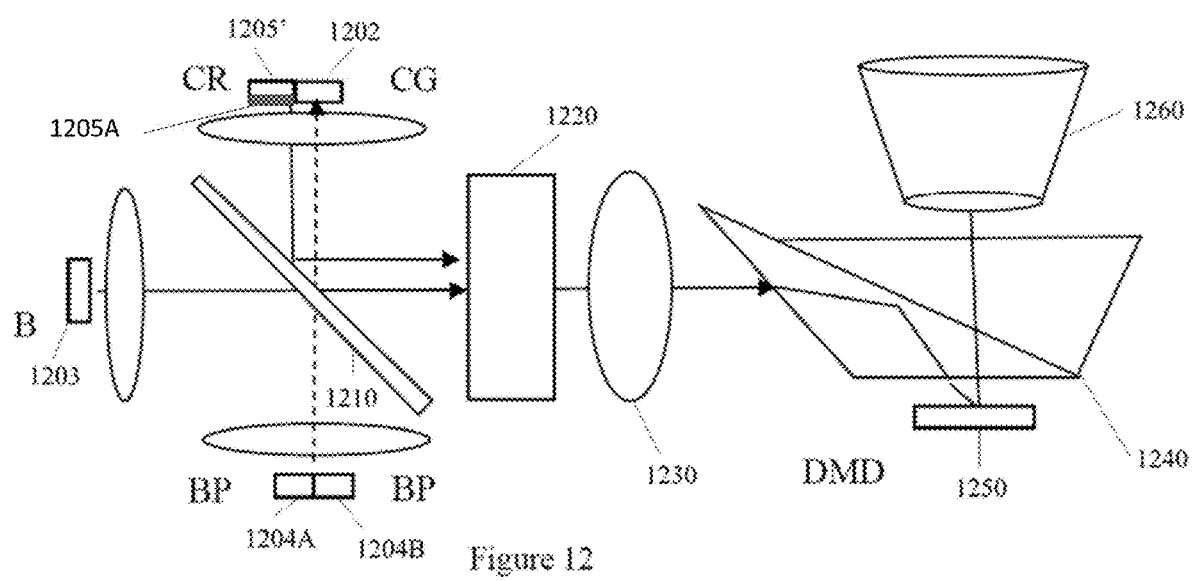
FIG. 12 illustrates another alternative embodiment of a compact size 3-channel light engine apparatus according to the present disclosure.
Figure 13:
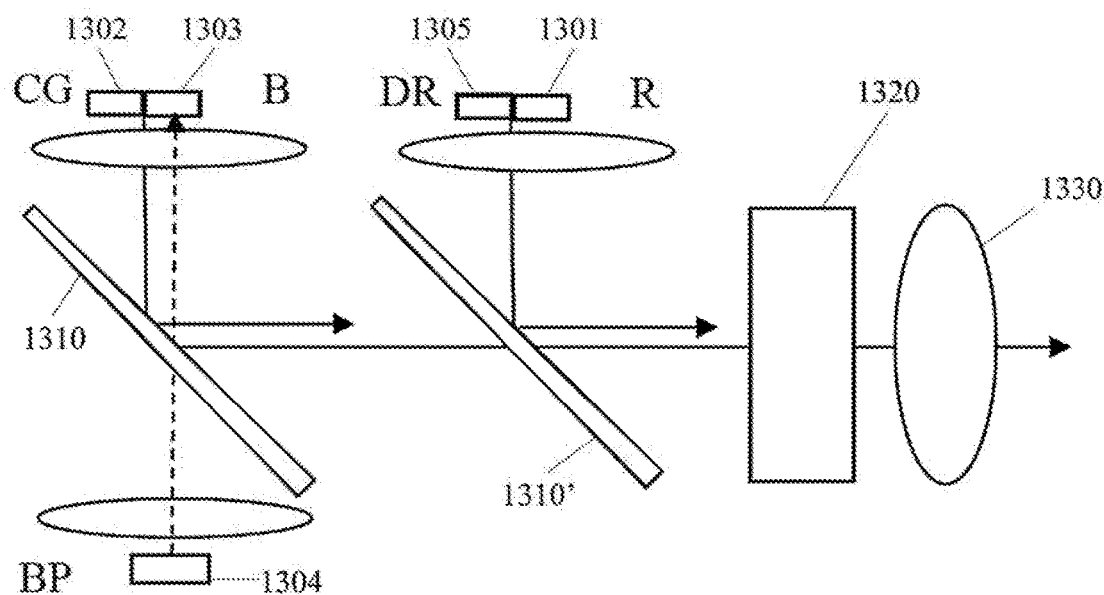
FIG. 13 illustrates another alternative embodiment of a compact size 3-channel light engine apparatus according to the present disclosure.

Another alternative embodiment of a compact size 3-channel light engine apparatus according to the disclosure is shown in FIG. 12, and it also comprises five R/G/B LED devices having different spectrums, including a converted red (CR) LED 1205', a converted green (CG) LED 1202, a blue LED 1203, a first blue pump LED 1204A and a second blue pump LED 1204B. Apart from the five R/G/B LED devices, other components including a fly-eye lens array 1220, a condenser lens 1230, a TIR prism 1240, a DMD 1250 and a projection lens 1260 are the same as those shown in FIG. 7. A converted red die of the converted red LED 1205' and a converted green die of the converted green LED 1202 are packaged onto one substrate, and a first blue pump die of the first blue pump LED 1204A and a second blue pump die of the second blue pump LED 12048 are packaged onto the other substrate. The first blue pump light from the first blue pump LED 1204A will pass through a wedged dichroic mirror 1210 so as to remotely pump the green phosphor platelet on the CG LED 1202 from the top of the platelet and the top pumped green light will be reflected at reflective layer of LED die of the CG LED 1202 and combined together with the bottom pumping converted green LED light. The CG LED 1202 is a converted green LED with a green phosphor platelet directly depositing on top of a blue LED die, and can be replaced by a remotely phosphor conversion green light device with a green phosphor deposited on a high reflective and thermally conductive substrate and the blue light pump the green phosphor from the top side, or a converted green rod/pipe with multiple blue LED dies attached to the rod/pipe which have green phosphor coated on a surface of the rod/pipe. The second blue pump light from the second blue pump LED 1204B will pass through a wedged dichroic mirror 1210 so as to remotely pump the red phosphor platelet on the CR LED 1205' from the top of the platelet and the top pumped red light will be reflected at reflective layer of LED die of the CR LED 1205' and combined together with the bottom pumping converted red LED light. The CR LED 1205' is a phosphor converted red LED with a red phosphor conversion plate directly depositing on top of a blue LED die, and it can be replaced by a remotely phosphor conversion red light device with a red phosphor deposited on a high reflective and thermally conductive substrate and the blue light pumps the red phosphor from the top side, in this embodiment, the CR LED 1205' is a high reflective and thermal conductive substrate and the red phosphor platelet 1205A is directly deposited on top of the substrate and the light from the second blue pump LED 1204B light will pump the red phosphor from the top side. The converted red-light beam, the converted green light beam, and the display blue light beam from the blue LED 1203 will be combined into a co-axial light path without Etendue increase. As an alternative, the compact size 3-channel light engine apparatus according to the disclosure can comprises two the wedged dichroic mirrors, as shown in FIG. 13, i.e. the first wedged dichroic mirror 1310 and the second wedged dichroic mirror 1310'. This light engine apparatus comprises five R/G/B LED devices having different spectrums, including a red LED 1301, a converted green (CG) LED 1302, a blue LED 1303, a blue pump LED 1304 and a deep red LED 1305. A blue die of the blue LED 1303 and a converted green die of the CG LED 1302 are packaged onto one substrate, and a re-amber die of the red LED 1301 and a deep red die of the deep red LED 1305 are packaged onto the other substrate. The blue pump light from the first blue pump LED 1304 will pass through a wedged dichroic mirror 1310 so as to remotely pump the green phosphor platelet on the CG LED 1302 from the top of the platelet and the top pumped green light will be reflected at reflective layer of LED die of the CG LED 1302 and combined together with the bottom pumping converted green LED light. The CG LED 1302 is a converted green LED with a green phosphor platelet directly depositing on top of a blue LED die, and can be replaced by a remotely phosphor conversion green light device with a green phosphor deposited on a high reflective and thermally conductive substrate and the blue light pump the green phosphor from the top side, or a converted green rod/pipe with multiple blue LED dies attached to the rod/pipe which have green phosphor coated on a surface of the rod/pipe. The converted green light and the display blue light will incident the wedged dichroic mirror 1310 at different angles and will be reflected by different sides of the wedged dichroic mirror 1310, which is configured to have a wedged angle, so that the principle axis of two different wavelength light beams after reflected from the different sides of the wedged dichroic mirror 1310 will overlap into the co-axial light path without etendue increase. The red-amber light beam and the deep red light beam will be combined by the wedged dichroic mirror 1310', the two different wavelength light beams incident the wedged dichroic mirror 1310' at different angles and will be reflected by different sides of the wedged dichroic mirror 1310', which is configured to have a wedged angle, so that the principle axis of two different wavelength light beams after reflected from the different sides of the wedged dichroic mirror 1310' will overlap into the same co-axial light path as the combined G/B light beams without etendue increase. The converted R/G/B light beam will pass through fly-eye lens array 1320 and the condenser lens 1330. The deep red LED 1305 may emit a long wavelength deep red light with peak wavelength over 630 nm, preferably in the range of 640~660 nm.

Figure 14:
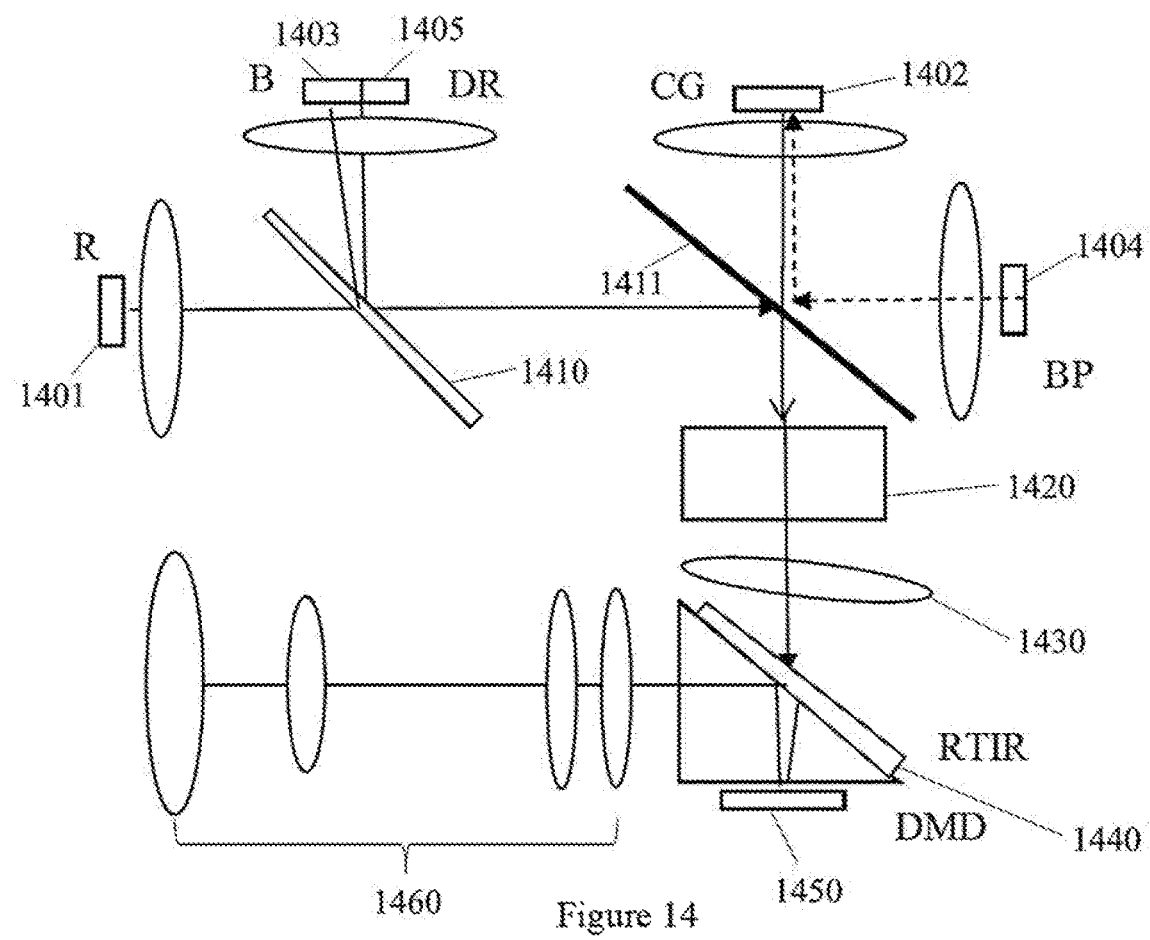
FIG. 14 illustrates an embodiment of a compact size 4-channel light engine apparatus according to the present disclosure.

As an embodiment of a compact size 4-channel light engine apparatus according to the disclosure is shown in FIG. 14 and comprises a red LED 1401, a converted green (CG) LED 1402, a blue LED 1403, a blue pump LED 1404 and a deep red (DR) LED 1405. A blue die of the blue LED 1403 and a deep red die of the DR LED 1405 are packaged onto the same substrate. The display blue light and the deep red light will incident a wedged dichroic mirror 1410 at different angles and will be reflected by different sides of the wedged dichroic mirror 1410 as the first optical collimation channel, which is configured to have a wedged angle, so that the principle axis of two different wavelength light beams after reflected from the different sides of the wedged dichroic mirror 1410 will overlap into the co-axial light path without etendue increase. The red-amber light beam from the red LED 1401 as the second optical collimation channel will pass through the wedged dichroic mirror 1410. The blue pump light from the blue pump LED 1404 as the third optical collimation channel will be reflected by a dichroic plate 1310 so as to remotely pump the green phosphor platelet on the CG LED 1402 from the top of the platelet and the top pumped green light will be reflected at reflective layer of LED die of the CG LED 1402 and combined together with the bottom pumping converted green LED light as the fourth optical collimation channel will. The deep light beam, the display blue light beam, the red-amber light beam will be reflected by the dichroic plate 1310 while the converted green light beam will pass through the dichroic plate 1310 so that the combined R/G/B light will hit the fly-eye lens array 1420 in the co-axial light path without etendue increase, pass through an inclined condenser lens 1430, enter into a RTIR prism 1440 to illuminate a DMD 1450, and project the image from the DMD 1450 onto the screen by the projection lens 1460. In this configuration, the dichroic plate 1310 and the RTIR prism 1440 are used in this light engine apparatus to fold light path two times for a miniaturized light engine apparatus, and the deep red LED may emit the long red wavelength with peak wavelength longer than 630 nm to have benefits of high green/red combination efficiency and red light less sensitive to high driving current and high duty cycle.

Figure 15:
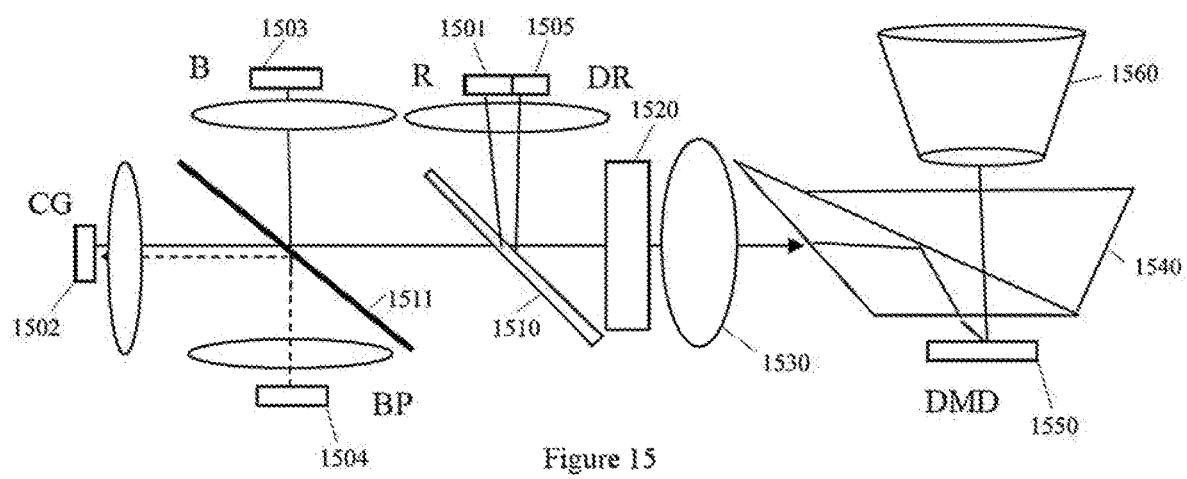
FIG. 15 illustrates an alternative embodiment of a compact size 4-channel light engine apparatus according to the present disclosure.

As an alternative embodiment of a compact size 4-channel light engine apparatus according to the disclosure is shown in FIG. 15 and comprises a red LED 1501, a converted green (CG) LED 1502, a blue LED 1503, a blue pump LED 1504 and a deep red (DR) LED 1505. This apparatus also comprises a fly-eye lens array 1520, a condenser lens 1530, a TIR prism 1540 and a projection lens 1560 which have the same arrangement as those in the embodiment shown in FIG. 7. A red-amber die of the red LED 1501 and a deep red die of the DR LED 1505 are packaged onto the same substrate. The red-amber light and the deep red light will incident a wedged dichroic mirror 1510 at different angles and will be reflected by different sides of the wedged dichroic mirror 1410 as the first optical collimation channel, which is configured to have a wedged angle, so that the principle axis of two different wavelength light beams after reflected from the different sides of the wedged dichroic mirror 1510 will overlap into the co-axial light path without etendue increase. The display blue light beam from the blue LED 1503 as the second optical collimation channel will be reflected by a dichroic plate 1511. The blue pump light from the blue pump LED 1504 as the third optical collimation channel will be reflected by the dichroic plate 1511 so as to remotely pump the green phosphor platelet on the CG LED 1502 from the top of the platelet and the top pumped green light will be reflected at reflective layer of LED die of the CG LED 1502 and combined together with the bottom pumping converted green LED light as the fourth optical collimation channel will. The combined R/G/B light will hit the fly-eye lens array 1520 in the co-axial light path without etendue increase. The deep red LED may emit the long red wavelength with peak wavelength longer than 630 nm to have benefits of high green/red combination efficiency and red light less sensitive to high driving current and high duty cycle.

Embodiments described above illustrate but do not limit the invention. It should also be understood that numerous modifications and variations are possible in accordance with the principles of the invention. Accordingly, the scope of the invention is defined only by the following claims.

The invention claimed is:

1. A light engine projection apparatus, comprising:
  a first light source comprising a first green light device configured to emit a green light beam;
  a second light source comprising a first blue light device configured to emit a blue light beam;
  a third light source comprising a first red light device configured to emit a red light beam;
  wherein at least two light sources are packaged on the same substrate;
  a first beam combiner configured to combine at least two light beams from said at least two light sources from a same light collimation channel so as to form a co-axial light path; and
  a folded light path assembly configured to miniaturize the enclosure volume of the light engine projection apparatus,
  wherein the first beam combiner comprises at least one wedged dichroic mirror or a diffraction grating plate, and wherein the folded light path assembly comprises at least a RTIR prism or a TIR prism configured to fold the co-axial light path for a compact size projection light engine system.

2. The light engine projection apparatus of claim 1, wherein the first red light device is a red LED, the first green device is a converted green LED, and the first blue light device is a blue LED; wherein at least two LED dies are packaged on the same substrate and enter into the same light collimation channel; and wherein when a converted green LED is packaged together with a red LED or blue LED die on the same substrate, an emitting plane shifting plate is configured to be deposited on top of the red or blue LED die to raise up the effective light emitting plane of the red or blue LED and align with the light emitting plane of the converted green LED which is on top of phosphor conversion platelet.

3. The light engine projection apparatus of claim 1, wherein the folded light path assembly further comprises an aspherical convex flat lens, and the RTIR prism comprises a wedged prism and a right angle prism, and wherein the wedged prism is configured to be bonded with the aspherical convex flat lens as a cemented relay lens which is used to focus a combined R/G/B light beam onto a micro-display panel, and wherein the optical axis of the cemented relay lens has an inclined angle with an axis of the co-axial light path to ensure that the principle axis of the combined R/G/B light beam incident at micro-display panel plane at a predefined angle.

4. The light engine projection apparatus of claim 1, wherein the folded light path assembly further comprises an aspherical convex flat lens, and the aspherical convex flat lens is bonded onto an input surface of the TIR prism.

5. The light engine projection apparatus of claim 1, further comprising:
  a second beam combiner configured to assist the first beam combiner in forming the co-axial light path, wherein the second beam combiner comprises at least one dichroic mirror, a X-plate or a X-cube dichroic mirror, wherein the dichroic mirrors from the first and second beam combiner have multiple-layers of dielectric coating to function as a short-pass dichroic mirror, a long-pass dichroic mirror or a single band-pass dichroic mirror;

wherein the green light beam, the blue light beam and the red light beam will be combined by the first and second beam combiners into the co-axial light path without Etendue increase.

6. The light engine projection apparatus of claim 2, wherein the red LED is configured to emit the first red wavelength light beam with peak wavelength between 640 nm and 660 nm, wherein the third light source further comprises a second red LED to emit a second red wavelength light beam with peak wavelength shorter than 630 nm so as to enhance the brightness of the red light beam, and the wavelength difference between the first red wavelength light beam and the second red wavelength light beam needs to have at least 25 nm to reduce dichroic mirror cutting loss.

7. The light engine projection apparatus of claim 2, wherein the second light source further comprises a second blue LED with peak wavelength between 430 nm and 450 nm, wherein the second blue LED is used to pump the phosphor platelet on the converted green LED from the top side.

8. The light engine projection apparatus of claim 2, wherein three LED dies of the red LED, the converted green LED and the blue LED are packaged on the same substrate and enter into the same light collimation channel for a single channel light engine projection apparatus; and the emitting plane shifting plate is configured to be deposited on top of the red LED die and the blue LED die to raise the effective light emitting plane to align with the emitting plane of the converted green LED.

9. The light engine projection apparatus of claim 8, wherein the first beam combiner comprises two wedged dichroic mirrors, wherein the two wedged dichroic mirrors are cemented with an air gap on a bonded surface between the two wedged dichroic mirrors so that the R/G/B light beams from the same light collimation channel will enter into the cemented two wedged dichroic mirrors at different angles and reflected at three surfaces of the cemented two wedged dichroic mirrors so as to combine into the co-axial light path without Etendue increase after leaving the cemented two wedged dichroic mirrors.

10. The light engine projection apparatus of claim 8, wherein the first beam combiner comprises one wedged dichroic mirror and further comprises a dichroic mirror, wherein the dichroic mirror and the wedged dichroic mirror are arranged at a certain angle so that the combined R/G/B light beams from the same light collimation channel will enter into the dichroic mirror and the wedged dichroic mirror at different angles and reflected at three surfaces of the dichroic mirror and the wedged dichroic mirror so as to be superimposed into the co-axial light path without Etendue increase.

11. The light engine projection apparatus of claim 1, wherein the folded light path assembly further comprises a folding mirror which is used together with the RTIR prism so as to fold the light path two times for miniaturizing the enclosure volume of the light engine projection apparatus for the compact size projection light engine system.

12. The light engine projection apparatus of claim 1, wherein the first red light device is a phosphor converted red LED with a red phosphor conversion plate directly depositing on top of a blue LED die, or a remotely phosphor conversion red light device with a red phosphor deposited on a high reflective and thermally conductive substrate and the blue light pump the red phosphor from the top side, and wherein the second light source further comprises a second blue LED with peak wavelength between 430 nm and 450 nm so as to pump the red phosphor conversion plate from the top of the red phosphor conversion plate.

13. The light engine projection apparatus of claim 1, wherein the first green light device is a converted green LED with a green phosphor platelet directly depositing on top of a blue LED die, or a remotely phosphor conversion green light device with a green phosphor deposited on a high reflective and thermally conductive substrate and the blue light pump the green phosphor from the top side, and wherein the second light source further comprises a second blue LED with peak wavelength of 430~450 nm to top pump the green phosphor platelet or the surface of the rod/pipe by a blue light beam, which is emitted from the second blue LED.

14. The light engine projection apparatus of claim 1, wherein the folded light path assembly further comprises a fly-eye array lens, a condenser lens and a projection lens, wherein the combined R/G/B light beam from the co-axial light path hits the fly-eye lens array for homogenization and is condensed by the condenser lens to illuminate the micro-display panel at a certain required angle, and then the projection lens project the image reflected from the micro-display panel onto a screen.

15. The light engine projection apparatus of claim 2, wherein the LED device with two LED dies packaged and another LED device from the first, second and third light sources sit in a same flat surface for simple thermal management with a single heat sink or heat pipe to miniature the enclosure volume of light engine projection apparatus.

16. The light engine projection apparatus of claim 2, wherein the emitting plane shifting plate is a clear glass plate, a glass plate with micro features on top, or a faceplate fused with fiber bundles.

17. A folded light path projection light engine system, comprising:
a multiple RGB light engine apparatus comprising at least three LEDs, wherein at least two LED dies are packaged on the same substrate and combined by at least one wedged dichroic mirror or a diffraction grating into co-axial light path without Etendue increase;
a fly-eye lens array configured to homogenize a combined R/G/B light beam from a co-axial light path of the light engine apparatus;
a condenser lens configured to condense the combined R/G/B light beam after homogenization;
a RTIR prism or a TIR prism configured to fold the co-axial light path for the projection light engine system; and
a projection lens configured to project the image reflected from the micro-display panel onto a screen,
wherein there is a certain angle between the optical axis of the condenser lens and the principle axis of the co-axial light path to ensure a uniform beam distribution at a DMD micro-display panel when the light incident the DMD micro-display plane at a predefined angle.

18. The folded light path projection light engine system of claim 17, wherein the condenser lens is an aspherical convex flat lens, and the RTIR prism comprises a wedged prism and a right angle prism, and the wedged prism is configured to be bonded with the aspherical convex flat lens as a cemented relay lens for easy light engine assembly, and wherein the cemented relay lens is used to focus the combined R/G/B light beam onto the micro-display panel, and the optical axis of the cemented relay lens has an inclined angle with an axis of the co-axial light path to ensure that the principle axis of the combined R/G/B light beam incident at micro-display panel plane at a predefined angle.

19. The folded light path projection light engine system of claim 17, wherein the condenser lens is an aspherical convex flat lens, and the aspherical convex flat lens is bonded onto an input surface of the TIR prism for easy light engine assembly.

20. The folded light path projection light engine system of claim 17, further comprising a folding mirror which is used with the RTIR prism so as to fold the light path two times for miniaturizing the enclosure volume of the light engine apparatus for the projection light engine system.

21. The folded light path projection light engine system of claim 17,
wherein the at least three LEDs comprises four LED dies packaged on two substrates, in which two LED dies are packaged on each substrate to form a two-channels light engine apparatus; and
wherein two wedged dichroic mirrors are used to combine the light beam from the four LED dies into co-axial light path without Etendue increase.

22. The folded light path projection light engine system of claim 21,
wherein the four LED dies include: a blue LED die and a converted green LED die packaged on the same substrate; and a long wavelength red die emitting peak wavelength around 640~660 nm and a short wavelength red die emitting peak wavelength less than 630 nm which are packaged on the same substrate,
wherein an emitting plane shifting plate is configured to be deposited on top of the blue LED die to raise up the light effective emitting plane of the blue LED and align with the light emitting plane of the converted green LED; and
wherein the projection light engine system further comprises a folding mirror which is used together with the RTIR prism so as to fold the light path two times for miniaturizing the enclosure volume of the light engine apparatus for the compact size projection light engine system.

23. The folded light path projection light engine system of claim 17,
wherein the at least three LEDs comprises four LEDs, in which two LED dies are packaged on the same substrate and another two LED dies are packaged on two substrates to form a three-channels light engine apparatus;
wherein at least one wedged dichroic mirror is used to combine the light beam from the two LED dies on the same substrate into co-axial light path without Etendue increase; and
wherein the TIR prism is used to fold the light path for miniaturizing the enclosure volume of the light engine apparatus for the projection light engine system.

24. The folded light path projection light engine system of claim 17,
wherein the at least three LEDs comprises five LEDs, in which four LED dies are packaged on two substrates and another LED die is packaged on a separate substrate to form a three-channels light engine apparatus; wherein one of the five LEDs emits long wavelength with peak wavelength of 640~660 nm, and another of the five LEDs emits short blue wavelength with peak wavelength of 430~450 nm to remotely pump the phosphor platelet on a converted green LED of the five LEDs from the top side;
wherein at least one wedged dichroic mirror is used to combine the light beam from the two LED dies on the same substrate into co-axial light path without Etendue increase; and
wherein the RTIR prism or TIR prism is used to fold the light path for miniaturizing the enclosure volume of the light engine apparatus for the compact size projection light engine system and achieving lumen brightness as high as 5000 lm.

25. The folded light path projection light engine system of claim 17,
wherein the at least three LEDs comprises five LEDs, in which two LED dies packaged on the same substrate, and another three LED dies packaged on three separate substrates to form a four-channels light engine apparatus; wherein one of the five LEDs emits long wavelength with peak wavelength of 640~660 nm and another of the five LEDs emits short blue wavelength with peak wavelength of 430~450 nm to remotely pump the phosphor platelet on a converted green LED of the five LEDs from the top side;
wherein at least one wedged dichroic mirror is used to combine the light beam from the two LED dies on the same substrate into co-axial light path without Etendue increase; and
wherein the RTIR prism or TIR prism is used to fold the light path for miniaturizing the enclosure volume of the light engine apparatus for the compact size projection light engine system and achieving lumen brightness as high as 5000 lm.

\* \* \* \* \*